(12) United States Patent
Chen

(10) Patent No.: US 10,777,151 B2
(45) Date of Patent: Sep. 15, 2020

(54) DRIVING METHOD OF DISPLAY DEVICE AND DISPLAY DEVICE

(71) Applicants: HKC Corporation Limited, Shenzhen, Guangdong (CN); Chongqing HKC Optoelectronics Technology Co., Ltd., Chongqing (CN)

(72) Inventor: Wei Chen, Guangdong (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 16/245,521

(22) Filed: Jan. 11, 2019

(65) Prior Publication Data
US 2020/0118503 A1 Apr. 16, 2020

Related U.S. Application Data

(63) Continuation of application No. PCT/CN2018/119046, filed on Dec. 4, 2018.

(30) Foreign Application Priority Data

Oct. 10, 2018 (CN) .......................... 2018 1 1182963

(51) Int. Cl.
*G09G 3/36* (2006.01)
*G02F 1/1333* (2006.01)

(52) U.S. Cl.
CPC ......... *G09G 3/3607* (2013.01); *G02F 1/1333* (2013.01); *G09G 3/3611* (2013.01)

(58) Field of Classification Search
CPC .............. G09G 3/3607; G09G 3/3659; G09G 2300/0439; G09G 2300/0443; G09G 2300/0478; G09G 2300/0809
See application file for complete search history.

(56) References Cited

U.S. PATENT DOCUMENTS

| | | | |
|---|---|---|---|
| 2006/0097971 A1* | 5/2006 | Lee ....................... | G09G 3/3648 345/89 |
| 2007/0058115 A1* | 3/2007 | Utsumi ............. | G02F 1/133514 349/109 |
| 2007/0195248 A1* | 8/2007 | Huh ..................... | G02F 1/13624 349/139 |
| 2008/0068314 A1* | 3/2008 | Hsieh ................ | G02F 1/133371 345/87 |
| 2009/0096976 A1* | 4/2009 | Kim ..................... | G02F 1/1393 349/143 |

(Continued)

FOREIGN PATENT DOCUMENTS

| | | |
|---|---|---|
| CN | 102254535 A | 11/2011 |
| CN | 104166258 A | 11/2014 |

(Continued)

*Primary Examiner* — Dong Hui Liang

(57) ABSTRACT

Disclosed are a driving method of a display device, which includes the following operations: acquiring at least one of a color parameter of a pixel, image frequency and image isolation; determining a correction coefficient according to the color parameter, image frequency and/or image isolation; determining a display parameter according to the correction coefficient; controlling the pixel to display according to the display parameter.

20 Claims, 13 Drawing Sheets

(56) References Cited

U.S. PATENT DOCUMENTS

2012/0242719 A1\* 9/2012 Klompenhouwer .......................... G09G 3/2074 345/690
2016/0247465 A1\* 8/2016 Chen .................... G09G 3/3607
2016/0253949 A1\* 9/2016 Chen ........................ G09G 3/36 345/599

FOREIGN PATENT DOCUMENTS

| CN | 104299592 A | 1/2015 |
| CN | 107068102 A | 8/2017 |
| CN | 107230446 A | 10/2017 |
| CN | 107529049 A | 12/2017 |
| CN | 107863085 A | 3/2018 |
| KR | 20080068477 A | 7/2008 |

\* cited by examiner

DRIVING METHOD OF DISPLAY DEVICE AND DISPLAY DEVICE

CROSS REFERENCE TO RELATED APPLICATIONS

The present application is a Continuation Application of PCT Application No. PCT/CN2018/119046 filed on Dec. 4, 2018, which claims the benefit of Chinese Patent Application No. 201811182963.2, filed on Oct. 10, 2018, which is incorporated herein by reference in its entirety.

TECHNICAL FIELD

The present application relates to the technical field of display, in particular, to a driving method of a display device, and a display device.

BACKGROUND

In a display device, especially a liquid crystal display device, the relationship between the transmittance of the display device and the driving voltage will change at different viewing angles due to the limitation of liquid crystal deflection, resulting in a decrease in the contrast of the display, a smaller viewing angle, and a color shift.

SUMMARY

The main purpose of the present application is to provide a driving method of a display device, aiming at solving the technical problem of a smaller viewing angle of the display device and occurrence of the color shift, and improving the display quality of the display device.

In order to achieve the aforementioned objective, the driving method of the display device is provided in the present application. The display device includes a display panel, where the display panel includes a plurality of pixels arranged in an array, at least part of the pixels are primary pixels, and at least part of the pixels are secondary pixels.

The driving method of the display device comprises the following operations:

acquiring at least one of a color parameter, image frequency and image isolation of a pixel, the color parameter including at least one of hue and saturation;

determining a correction coefficient of the pixel according to the color parameter, the image frequency and/or the image isolation;

determining a display parameter of the pixel according to the correction coefficient; and controlling the pixel to display according to the display parameter;

wherein, a brightness of the primary pixel after correction is greater than a brightness before correction, a brightness after correction of the secondary pixel is less than a brightness before correction, and an absolute value of a sum change of the brightness of the primary pixel and the secondary pixel before and after correction is less than or equal to a preset brightness difference, and an absolute value of a chromaticity change of the pixel before and after correction is less than or equal to a preset chromaticity difference.

In the technical solution of the present application, the display device includes a display panel, where the display panel includes a plurality of pixels arranged in an array. At least a part of the pixels are primary pixels, and at least a part of the pixels are secondary pixels.

The driving method of the display device includes the following operations: acquiring at least one of a color parameter of the pixel, image frequency and image isolation, where the color parameter includes at least one of hue and saturation; determining a correction coefficient of pixels according to a color parameter, image frequency and/or image isolation; determining display parameter of pixels according to a correction coefficient; and controlling the pixels to display according to the display parameter; and controlling the pixel to display according to the display parameter;

where, a brightness of the primary pixel after correction is greater than a brightness before correction, a brightness after correction of the secondary pixel is less than a brightness before correction, and an absolute value of a sum change of the brightness of the primary pixel and the secondary pixel before and after correction is less than or equal to a preset brightness difference, and an absolute value of a chromaticity change of the pixel before and after correction is less than or equal to a preset chromaticity difference.

The display parameter of the primary pixel and the secondary pixel are controlled according to at least one of the color parameter, image frequency and image isolation of the display screen, so that the primary pixel is displayed in a light state and the secondary pixel is displayed in a dark state, while ensuring that the overall brightness and overall chromaticity of the display device before and after correction are basically constant, thereby increasing the visual angle, reducing the color shift and improving the display quality without compromising transmittance of the display device.

BRIEF DESCRIPTION OF THE ACCOMPANYING DRAWINGS

In order to explain the embodiments of the present application or the technical solutions in the prior art more clearly, the drawings used in the embodiments or the description of the prior art will be briefly introduced below. Obviously, the drawings in the following description are only some embodiments of the present application. For those skilled in the art, some other drawings can be obtained according to the structures shown in these drawings without paying creative effort.

Figure 1:
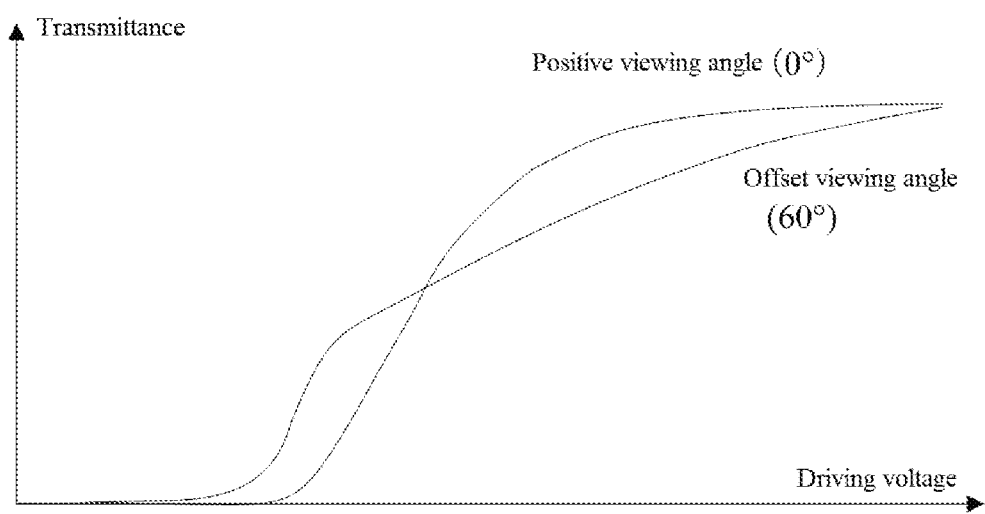
FIG. 1 is a schematic diagram between transmittance and driving voltage of a display device under different viewing angles in some embodiments.

The implementation, functional features and advantages of the purpose of the present application will be further described with reference to the accompanying drawings in conjunction with the embodiments.

DETAILED DESCRIPTION OF ILLUSTRATIVE EMBODIMENTS

The technical solution in the embodiment of the present application will be described clearly and completely in the following with reference to the drawings in the embodiment of the present application. Obviously, the described embodiment is only a part of the embodiment of the present application, but not all of the embodiments.

Based on the embodiments in the present application, all other embodiments obtained by a person of ordinary skill in the art without creative effort are within the protection scope of the present application.

It should be noted that if directional indications (such as up, down, left, right, front, back, etc.) are involved in the embodiments of the present application, the directional indications are only used to explain the relative positional relationship and movement between the components in a certain posture (as shown in the drawings), and if the specific posture changes, the directional indications will change accordingly.

In addition, if there are descriptions of "first" and "second" in the embodiments of the present application, the descriptions of "first" and "second" are for descriptive purposes only and cannot be understood as indicating or implying their relative importance or implicitly indicating the number of indicated technical features.

Thus, features defining "first" and "second" may explicitly or implicitly include at least one such feature.

In addition, the meaning of "and/or" appearing in the full text is to include three parallel schemes, taking "a and/or b" as some embodiments, including solution of a or b, or solution that both a and b satisfy at the same time.

In addition, the technical solutions between the various embodiments may be combined with each other, but must be based on what one of ordinary skill in the art can achieve. When the combination of technical solutions is contradictory or impossible to achieve, it should be considered that the combination of such technical solutions does not exist and is not within the protection scope required by the present application.

In the following, the technical solution of the present application will be described in detail by taking the liquid crystal display device as an example.

As shown in FIG. 1, in some embodiments, due to the limitation of liquid crystal deflection, the transmittance-driving voltage curve of the display device will drift compared to the transmittance-driving voltage curve at a positive viewing angle, resulting in a decrease in contrast of the display screen, a smaller viewing angle, and a color shift.

Figure 2:
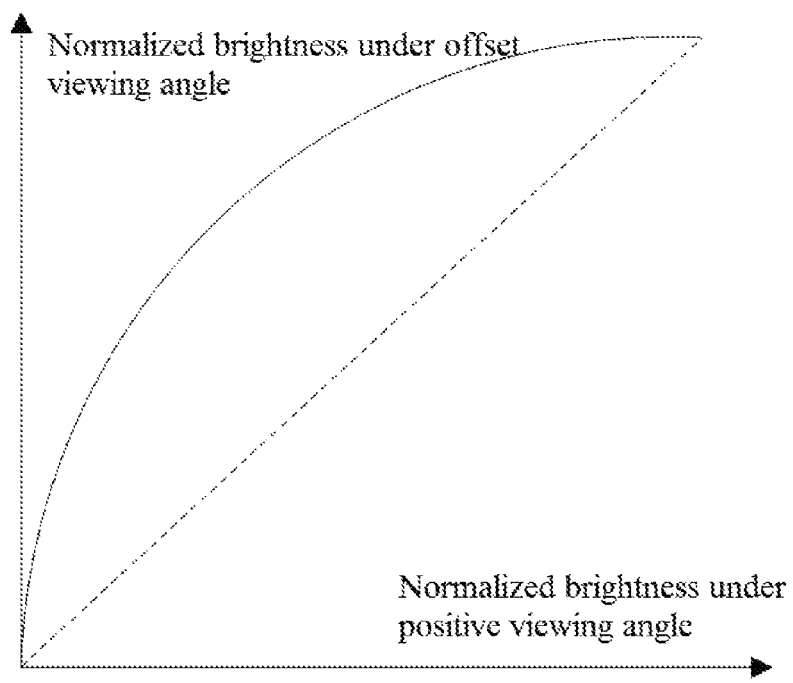
FIG. 2 is a schematic diagram of a relationship between normalized brightness under partial viewing angle and normalized brightness under small viewing angle in some embodiments.
Figure 3:
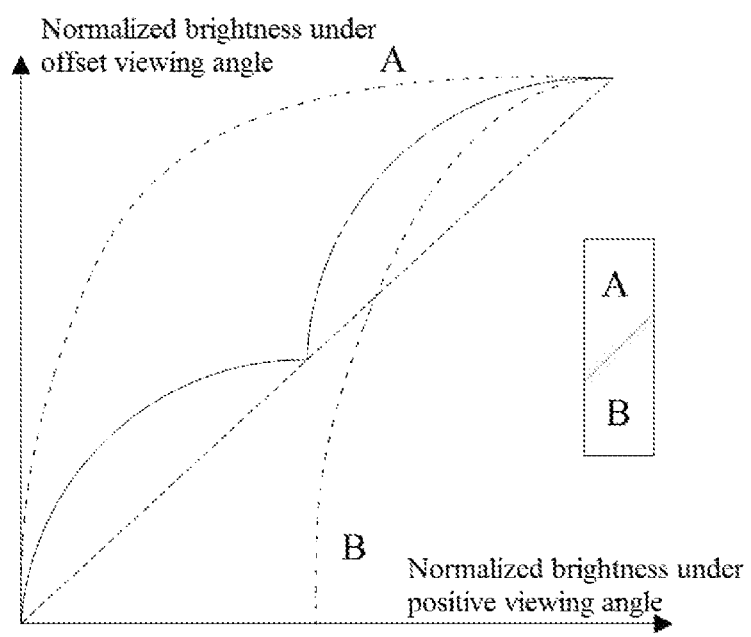
FIG. 3 is a schematic diagram of a relationship between normalized brightness under a partial viewing angle and normalized brightness under a positive viewing angle in other embodiments.

As shown by the dashed lines in FIG. 2 and FIG. 3, in an ideal situation, the normalized brightness at the partial viewing angle and the normalized brightness at the positive viewing angle are in a linear relationship, however, as shown by the solid lines in FIG. 2, in a practical situation, the normalized brightness at the partial viewing angle and the normalized brightness at the positive viewing angle are in a non-linear relationship.

As shown in FIG. 3, in another embodiment, in order to correct the phenomenon that the viewable angle of the display device becomes smaller and color shift occurs, the pixel or sub-pixel is split into two parts A and B, and the part A and the part B are controlled to display different brightness.

In FIG. 3, the two dash lines correspond to the relationship between the normalized brightness of part A and part B under the partial viewing angle and the positive viewing angle, respectively, where the brightness actually displayed by part A is higher and the brightness actually displayed by part B is lower, while the effect of the final mixing of part A and part B is as shown by the solid line in FIG. 3, which is close to the ideal situation shown by the dashed line in FIG. 3, thus improving the viewing angle of the display device and reducing the color shift.

However, this method of partitioning the pixels or sub-pixels themselves will also lead to a decrease in the transmittance of the pixels or sub-pixels in the display device. When the chromaticity visual angle of the display device is increased from 45 degree to 63 degree, the transmittance will decrease from 5.1% to 3.7%, resulting in a deterioration in the display quality.

The present application provides a driving method of a display device, which controls the display parameter of a primary pixel and a secondary pixel according to at least one of a color parameter, image frequency and image isolation of a display screen, thereby improving the visual angle of the display device, reducing color shift and improving the display quality while ensuring the transmittance of the display device.

Figure 4:
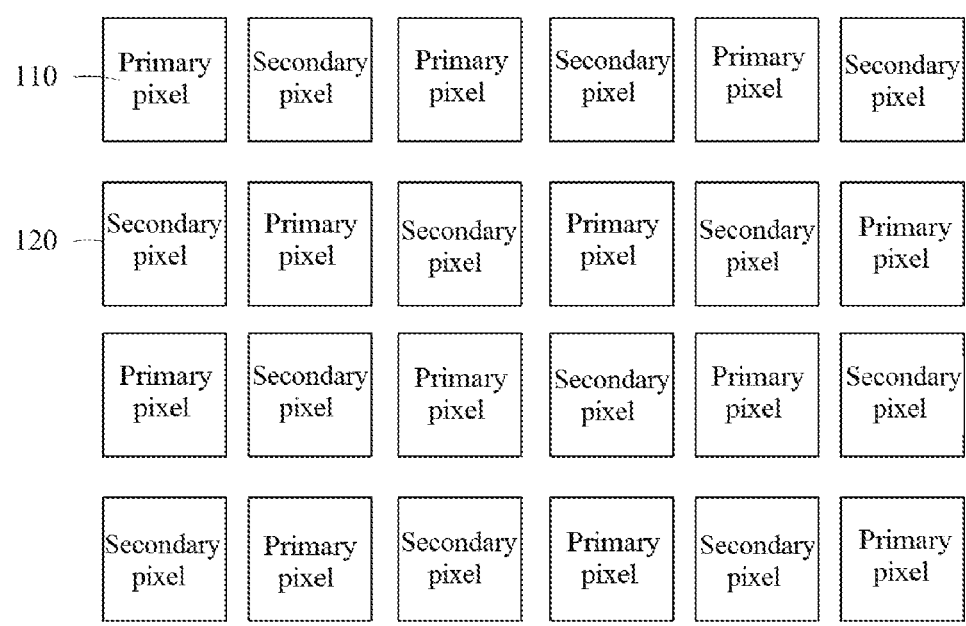
FIG. 4 is a structural schematic diagram of a display panel according to some embodiments of the driving method of the display device of the present application.
Figure 5:
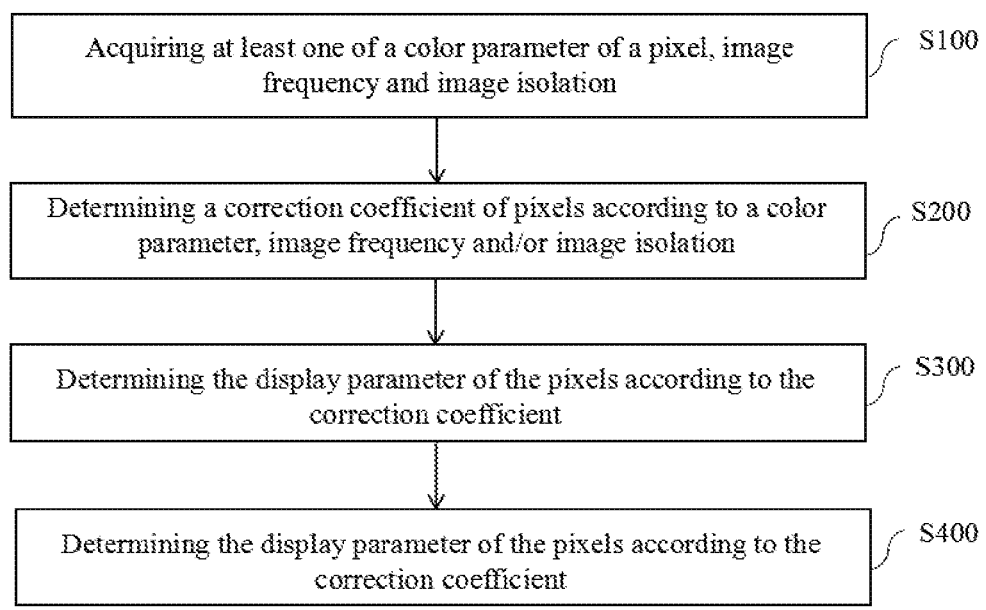
FIG. 5 is a flowchart of the driving method of the display device in FIG. 4.

In some embodiments of the present application, as shown in FIG. 4, the display device includes a display panel including a plurality of pixels arranged in an array, at least some of which are primary pixels 110 and at least some of which are secondary pixels 120. As shown in FIG. 5, the driving method of the display device includes the following steps:

Step S100, acquiring at least one of a color parameter of a pixel, image frequency and image isolation, where the color parameter include at least one of hue and saturation;

Step S200: determining a correction coefficient of pixels according to a color parameter, image frequency and/or image isolation;

Step S300: determining the display parameter of the pixels according to the correction coefficient; and, Step S400: controlling the pixel to display according to the display parameter.

In which, the corrected brightness of the primary pixel 110 is greater than the brightness before correction, the corrected brightness of the secondary pixel 120 is less than the brightness before correction.

An absolute value of a sum change of the brightness of the primary pixel 110 and the secondary pixel 120 before and after correction is less than or equal to a preset brightness difference, and an absolute value of a chromaticity change of the pixel 110 before and after correction is less than or equal to a preset chromaticity difference.

Specifically, the pixels on the display panel are usually arranged in a rectangular array, in which part of the pixels are primary pixels 110 and part of the pixels are secondary pixels 120. The primary pixels 110 and secondary pixels 120 can be arranged according to certain rules. In some embodiments shown in FIG. 4, the pixels adjacent to the top, bottom, left and right of the primary pixels 110 are secondary pixels 120, and the pixels adjacent to the top, bottom, left and right of the secondary pixels 120 are all primary pixels 110, thus contributing to uniform brightness and chromaticity of the entire display panel.

Of course, in some other specific embodiments, the display panel may be divided into different display areas according to the viewing angle, and the primary pixel 110 and the secondary pixel 120 may be provided in the display area corresponding to the viewing angle, and are driven according to the driving method described hereinafter. However, in the display area corresponding to the positive viewing angle, the primary pixel and the sub-pixel are no longer distinguished, and are directly driven according to the driving method in the above embodiment.

the color parameter of the pixels are determined according to the original picture signal, and the color parameter specifically includes hue and/or saturation.

In the display device, one pixel (the primary pixel 110 or the secondary-pixel 120) usually includes three sub-pixels of red, green and blue sub-pixels, thus displaying of multiple colors under the principle of spatial color mixing. Accordingly, the color mode used in the display device is usually red, green and blue color mode (RGB color mode).

In order to obtain color harmony and/or saturation of pixels, RGB color mode can be converted to hue saturation luminance color mode (HSV color mode).

In which, H stands for hue and S stands for saturation, the specific conversion relationship is as follows:

When max $(R,G,B)$=min $(R,G,B)$, $h$=0°.

When $r$=max $(R,G,B)$, $h$=((G−B)/(max $(R,G,B)$−min $(R,G,B)$)) mod 6)*60°.

When $g$=max $(R,G,B)$, $h$=(2+(B−R)/(max $(R,O,B)$−min $(R,O,B)$))*60°;

When $b$=max $(R,G,B)$, $h$=(4+(R−G)/((max $(R,G,B)$−min $(R,G,B)$))*60°;

When max $(R,G,B)$=0, $s$=0;

When max $(R,G,B)$≠0, $s$=(max $(R,G,B)$−min $(R,G,B)$)/max $(R,G,B)$.

According to the aforementioned conversion formula between RGB color mode and HSV color mode, the hue and/or saturation of the primary pixel 110 and the sub-pixel 120 before correction can be obtained, respectively.

The hue in the color parameter can reflect the categories of displayed objects, and users may pay more attention to some special objects. Therefore, better display results can be obtained by adjusting the display parameter of pixels at these special object positions.

For example, when it is determined that the displayed object is a human face according to the hue, since the user usually pays more attention to the face in the display screen, if this part is located at the partial viewing angle position, a larger color shift will occur, which will have a more obvious impact on the display quality.

In order to make the display effect of the face better, a larger correction intensity can be determined for the display area with the corresponding hue by the correction coefficient, and the first display parameter of the primary pixel and the second display parameter of the secondary pixel in the display area can be further corrected according to the correction coefficient, so as to increase the viewing angle and reduce the color shift.

Of course, special objects can also be other objects such as plants and animals, and automatic switching of modes can be realized by setting different display modes in advance in the display device, giving the corresponding relationship between hue and correction coefficient in each mode, by the user's own mode selection, or by automatic recognition of the display screen.

The saturation in the color parameter reflects the brightness of the colors in the display screen. Generally, the greater the saturation of the pixels, the greater the color shift that may occur under a large viewing angle. Accordingly, more correction intensity is needed to correct the color shift.

Specifically, the correction coefficient is determined according to the saturation of the pixel before correction, and the first display parameter of the primary pixel and the second display parameter of the secondary pixel are further determined according to the correction coefficient, so that the primary pixel 110 is displayed according to the first display parameter and the sub-pixel 120 is displayed according to the second display parameter.

The image frequency of pixels reflects the edge features of the display screen.

Generally, the edge part in the display screen corresponds to a high frequency image, while the other parts correspond to a low frequency image.

In high frequency images, the display parameter between adjacent pixels often differ greatly. At this time, if the correction coefficient is determined only based on the color parameter such as hue and saturation of the display screen, distortion of the display screen is likely to occur.

Therefore, with the increase of image frequency, the correction coefficient should be adjusted accordingly to reduce the correction intensity of the high-frequency image part or not to make additional correction to the high-frequency image part in order to improve the display quality.

The image isolation of pixels reflects whether the corresponding area in the display screen is a small object, such as a cursor.

When the degree of image isolation is high, the display parameter between adjacent pixels often differ greatly. As such, if the correction coefficient is determined only based on the color parameter such as hue and saturation of the display screen, distortion of the display screen is likely to result.

Therefore, with the increase of image isolation, the correction coefficient should be adjusted accordingly to reduce the correction intensity of the small object image or not to make additional correction to the small object image part to improve the display quality.

In which, the display parameter specifically includes the gray scale of each sub-pixel in the primary pixel 110 or secondary pixel 120. According to the display gray scale of each sub-pixel, information such as hue, saturation, brightness and chroma of the primary pixel 110 or secondary pixel 120 can be further obtained.

In the present embodiment, the primary pixel 110 is displayed in a bright state and the secondary pixel 120 is displayed in a dark state to respectively simulate the curves of part a and part b in FIG. 3, increasing the viewable angle of the display device and reducing the color shift.

Generally, when the hue of a pixel corresponds to the above-mentioned special object, or when the pixel saturation before correction is rather large, the brightness difference between the primary pixel and the sub-pixel after correction is also large.

Meanwhile, in order to keep the overall brightness of the display screen constant, when the primary pixel 110 is displayed with the first display parameter and the sub-pixel 120 is displayed with the second display parameter, the absolute value of the sum change of the brightness of the primary pixel 110 and the sub-pixel 120 before and after correction is less than or equal to the preset brightness difference, which is a very small value, that is, the value increased by the brightness of the corrected primary pixel is basically equal to the value decreased by the brightness of the corrected secondary pixel.

In order to zero the overall color shift of the display screen, the absolute value of the change in pixel chromaticity before and after correction is less than or equal to a preset chromaticity difference, wherein the preset chromaticity difference is a very small value.

In the present embodiment, the display device includes a display panel including a plurality of pixels arranged in an array, at least some of which are primary pixels 110 and at least some of which are sub-pixels 120. The driving method of the display device includes the following operations: acquiring at least one of a color parameter of a pixel, image frequency and image isolation, in which the color parameter include at least one of hue and saturation; determining a correction coefficient of pixels according to a color parameter, the image frequency and/or the image isolation; determining a display parameter of pixels according to the correction coefficient; controlling pixels to display according to the display parameter; The corrected brightness of the primary pixel 110 is greater than the brightness before correction, the corrected brightness of the secondary pixel 120 is less than the brightness before correction. The absolute value of the sum change of the brightness of the primary pixel 110 and the secondary pixel 120 before and after correction is less than or equal to the preset brightness difference, and the absolute value of the change of the chromaticity of the pixel 110 before and after correction is less than or equal to the preset chromaticity difference.

According to the color parameter of the display screen, including at least one of hue and saturation, the display parameter of the primary pixel 110 and the sub-pixel 120 are controlled so that the primary pixel 110 is displayed in a light state and the sub-pixel 120 is displayed in a dark state, while ensuring that the overall brightness and overall chromaticity of the display device before and after correction are basically constant, thereby increasing the visual angle, reducing the color shift and improving the display quality while ensuring the transmittance of the display device.

In which, the pixel comprises at least one sub-pixel, and the step of acquiring the image frequency of the pixel includes:

Step S111, acquiring a first gray scale pixel0 of each sub-pixel of the pixel before correction;

Step S112: acquiring the second gray scale pixel before correction of each sub-pixel in the neighboring pixels within the first preset distance adjacent to the pixel;

Step S113: calculating an absolute value of a difference between a second gray scale of a sub-pixel in the neighboring pixel and a first gray scale of the sub-pixel in the pixel $\Delta_m=|\text{pixel}_0-\text{pixel}_m|$, and recording the absolute value as a relative gray scale $\Delta_m$ of the neighboring pixel; and Step S114: normalizing a maximum relative gray scale among the relative gray scale within the first preset distance adjacent to the pixel, and recording the normalized maximum relative gray scale as the image frequency of $\eta_1$ $\max(\Delta_m)$ the pixel T, where $\eta_1$ is the frequency normalization coefficient.

Figure 6:
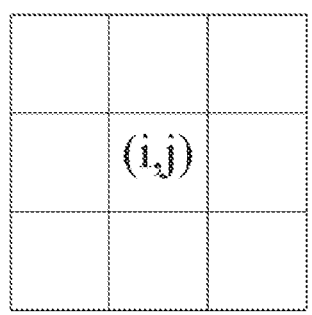
FIG. 6 is a schematic diagram of a pixel structure for calculating the image frequency in a specific embodiment.

As shown in FIG. 6, in a specific embodiment, the calculation process of the image frequency T(i,j) of the pixel (i, j) is as follows:

The pixel (i, j) have eight neighboring pixels, and each of the nine pixels in FIG. 6 includes three sub-pixels of red, green and blue (not shown), and the arrangement of sub-pixels in each pixel is generally the same.

Of the eight neighboring pixels of the pixel (i, j), the absolute value of the gray scale difference before correction of each corresponding sub-pixel is:

$\Delta_1=|\text{pixel}(i,j,R)-\text{pixel}(i-1,j-1,R)|$, $\Delta_2=|\text{pixel}(i,j,R)-\text{pixel}(i-1,j,R)|$, $\Delta_3=|\text{pixel}(i,j,R)-\text{pixel}(i-1,j+1,R)|$, $\Delta_4=|\text{pixel}(i,j,R)-\text{pixel}(i,j-1,R)|$, $\Delta_5=|\text{pixel}(i,j,R)-\text{pixel}(i,j+1,R)|$, $\Delta_6=|\text{pixel}(i,j,R)-\text{pixel}(i+1,j-1,R)|$, $\Delta_7=|\text{pixel}(i,j,R)-\text{pixel}(i+1,j,R)|$, $\Delta_8=|\text{pixel}(i,j,R)-\text{pixel}(i+1,j+1,R)|$, $\Delta_9=|\text{pixel}(i,j,G)-\text{pixel}(i-1,j-1,G)|$, $\Delta_{10}=|\text{pixel}(i,j,G)-\text{pixel}(i-1,j,G)|$, $\Delta_{11}=|\text{pixel}(i,j,G)-\text{pixel}(i-1,j+1,G)|$, $\Delta_{12}=|(i,j,G)-\text{pixel}(i,j-1,G)|$, $\Delta_{13}=|\text{pixel}(i,j,G)-\text{pixel}(i,j,+1,G)|$, $\Delta_{14}=|\text{pixel}(i,j,G)-\text{pixel}(i+1,j-1,G)|$, $\Delta_{15}=|(i,j,G)-\text{pixel}(i+1,j,G)|$, $\Delta_{16}=|\text{pixel}(i,j,G)-\text{pixel}(i+1,j+1,G)|$, $\Delta_{17}=|\text{pixel}(i,j,B)-\text{pixel}(i-1,j-1,B)|$, $\Delta_{18}=|\text{pixel}(i,j,B)-\text{pixel}(i-1,j,B)|$, $\Delta_{19}=|\text{pixel}(i,j,B)-\text{pixel}(i-1,j+1,B)|$, $\Delta_{20}=|\text{pixel}(i,j,B)-\text{pixel}(i,j-1,B)|$, $\Delta_{21}=|\text{pixel}(i,j,B)-\text{pixel}(i,j+1,B)|$, $\Delta_{22}=|\text{pixel}(i,j,B)-\text{pixel}(i+1,j-1,B)|$, $\Delta_{23}=|\text{pixel}(i,j,B)-\text{pixel}(i+1,j,B)$, $\Delta_{24}=|\text{pixel}(i+1,j+1,B)|$;

In which, i, i+1, i−1 represent the abscissa of the pixel; j, j+1, j−1 represent the ordinate of the pixel, and R, G, and B respectively represent the red, green, and blue sub-pixels in the pixel, pixel(i,j,R), pixel(i,j,B) is equivalent to $\text{pixel}_0$ (because there are multiple sub-pixels, each sub-pixel has a corresponding one $\text{pixel}_0$), and the image frequency of other pixels corresponding to $\text{pixel}_m$, T(i,j) of the coordinate (i, j) satisfies T(i, j)=$\eta_1$ max ($\Delta_1, \Delta_2, \ldots, \Delta_{24}$) and $\eta_1$ is the frequency normalization coefficient. It should be noted that in other specific embodiments, other neighboring pixels may also be selected to realize the calculation of the image frequency, i.e. changing the first preset distance, which will not be described herein. In which, the pixel includes at least one sub-pixel, and the step of acquiring the image isolation of the pixel includes:

Step S121: acquiring the first gray scale pixel0 of each sub-pixel in the pixel before correction;

Step S122: acquiring the second gray scale pixel, before correction of each sub-pixel in the neighboring pixels within the first preset distance adjacent to the pixel;

Step S123: calculating an absolute value of a difference between a second gray scale of a sub-pixel in the neighboring pixel and a first gray scale of the sub-pixel in the pixel $\Delta_m=|\text{pixel}_0-\text{pixel}_m|$, and recording the absolute value as a relative gray scale of the neighboring pixel $\Delta_m$;

Step S124: comparing the relative gray scale $\Delta_m$ with a preset gray scale threshold $\Delta_0$, and accumulating a number of neighboring pixels $N(\Delta_n \geq \Delta_0)$ of which the relative gray scale $\Delta_m$ is greater than or equal to the preset gray scale threshold $\Delta_0$; and Step S125: recording a number of normalized neighboring pixels as the image isolation of the pixel $\eta_2 N(\Delta_n \geq \Delta_0)$, and the $\eta_2$ is normalized coefficient of the isolation.

Figure 7:
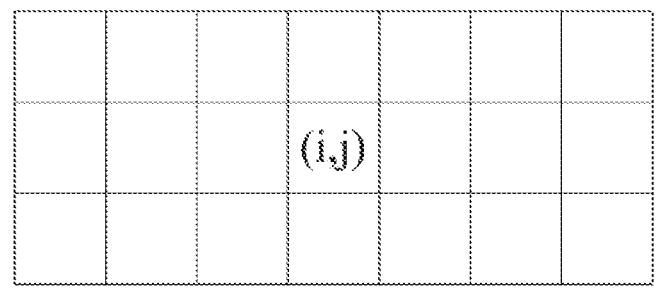
FIG. 7 is a schematic diagram of a pixel structure for calculating image isolation in a specific embodiment.

As shown in FIG. 7, in a specific embodiment, the calculation process of the image isolation $U(i,j)$ of the pixel $(i,j)$ is as follows:

Three neighboring pixels are selected respectively in the left and right directions of the pixel $(i, j)$ and two neighboring pixels are selected respectively in the up and down directions, assuming that the pixel $(i, j)$ and their neighboring pixels all include red sub-pixels, green sub-pixels and blue sub-pixels and the arrangement of sub-pixels in each pixel is the same. Then the absolute values of gray scale differences between the pixel $(i, j)$ and their surrounding 20 neighboring pixels are calculated, that is, the absolute values of gray scale differences between the red sub-pixels in the pixel $(i, j)$ and the red sub-pixels in the 20 neighboring pixels are calculated respectively, and the absolute values of gray scale differences between the green sub-pixels in the pixel $(i, j)$ and the green sub-pixels in the 20 neighboring pixels are calculated respectively, and the absolute values of gray scale differences between the blue sub-pixels in the pixel $(i, j)$ and the blue sub-pixels in the 20 neighboring pixels are calculated respectively. The relative gray scale data $\Delta_1, \Delta_2, \ldots, \Delta_{60}$ are calculated. Further, the number is $N(\Delta_n \geq \Delta_0)$ of neighboring pixels whose relative gray scale to the pixels $(i, j)$ is greater than or equal to the preset gray scale threshold $\Delta_0$ among the total of 20 neighboring pixels. The image isolation of the pixels $U(i,j)$ with coordinates $(i, j)$ satisfies $U(i,j) = \eta_2 N(\Delta_n \geq \Delta_0)$, where $\eta_2$ is the isolation normalization coefficient. It should be noted that in other specific embodiments, other neighboring pixels can also be selected to realize the calculation of image isolation, i.e. changing the first preset distance, which will not be described herein.

Further, the pixel includes at least one sub-pixel, and the display parameter include a first data electric level of sub-pixels in the primary pixel and a second data electric level of sub-pixels in the secondary pixel. Step S300 includes:

Step S311, determining the first gamma electric level of the sub-pixel according to a first gamma value and the gray scale of the sub-pixel before correction;

Step S312, determining the second gamma electric level of the sub-pixel according to a second gamma value and the gray scale of the sub-pixel before correction;

Step S313: determining a first data electric level of sub-pixels of the primary pixel according to the correction coefficient, the first gamma electric level and the second gamma electric level;

Step S314: determining the third gamma electric level of the sub-pixel according to the third gamma value and the gray scale of the sub-pixel before correction;

Step S315: determining the second data electric level of sub-pixel of the secondary pixel according to the correction coefficient, the first gamma electric level and the third gamma electric level.

In which, the gamma response corresponding to the mixing of the second gamma value and the third gamma value is equivalent to the gamma response corresponding to the first gamma value, and the second gamma value is not equal to the third gamma value.

Figure 8:
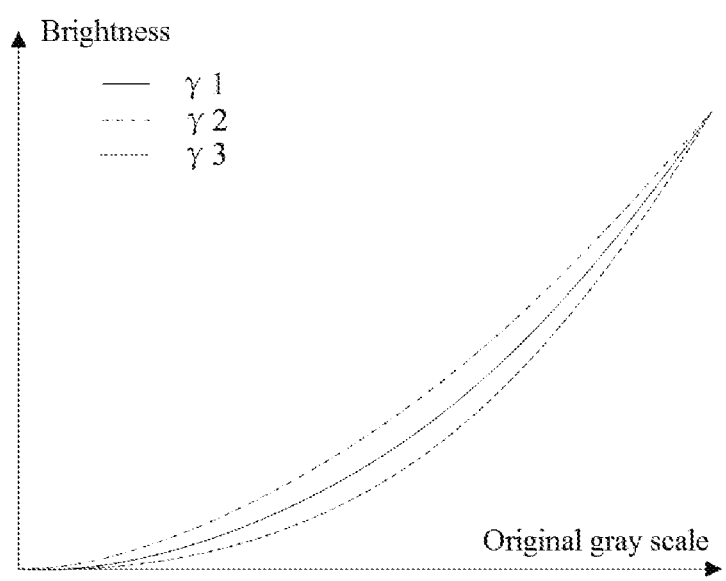
FIG. 8 is a schematic diagram of gamma response corresponding to a first gamma value, a second gamma value and a third gamma value in some embodiments of the driving method of the display device.

In the display panel, the sub-pixels are electrically connected to their corresponding data lines, and the liquid crystal in the sub-pixels deflects under the driving of the data electric level signals of the data lines, resulting in changes in light transmittance, thus displaying different gray scales. However, due to the influence of the photoelectric characteristics of the liquid crystal, if the data electric level signal driving the sub-pixels is determined directly from the original picture signal, there will be a non-linear gamma response between the data electric level signal and the gray scale finally displayed. Therefore, in the driving process, it is necessary to carry out inverse gamma correction on the original picture signal to obtain the corrected data electric level signal, to compensate for the non-linear characteristics of the display device and realize distortion-free display. As shown in FIG. 8, when performing inverse gamma correction on the original picture signal, the corrected gamma value in the inverse gamma correction process is determined according to the gamma value corresponding to the gamma response of the display device. Specifically, the relationship between the corrected gamma value and the gamma value is usually reciprocal. The gamma value reflects the characteristics of the display device in nature. The first gamma value $\gamma 1$ corresponds to the normal display state, and the typical first gamma value $\gamma 1$ is 2.2 to 2.5, and the commonly used first gamma value $\gamma 1$ is 2.2. The second gamma value $\gamma 2$ corresponds to a display state in which the display is bright, and the second gamma value $\gamma 2$ is smaller than the first gamma value $\gamma 1$. The third gamma value $\gamma 3$ corresponds to a display state in which the display is dark, and the third gamma value $\gamma 3$ is larger than the first gamma value $\gamma 1$. Therefore, according to the first gamma value and the gray scale before correction, the first gamma electric level of the sub-pixel in the normal display state can be calculated. According to the second gamma value and the gray scale before correction, the second gamma electric level in the sub-pixel with the bright display state can be calculated. According to the third gamma value and the gray scale before correction, the third gamma electric level in the sub-pixel with the dark display state can be calculated. Further, in order to avoid display distortion, the gamma response corresponding to the mixing of the second gamma value $\gamma 2$ and the third gamma value $\gamma 3$ is equivalent to the gamma response corresponding to the first gamma value, i.e., the second gamma value $\gamma 2$ and the third gamma value $\gamma 3$ are symmetrical with respect to the first gamma value $\gamma 1$. The gray scale difference in display between the sub-pixels of the primary pixel 110 and the sub-pixels of the secondary-pixel 120 is controlled by the correction coefficient to improve the viewable angle of the display device. Generally, the deflection angle of the liquid crystal is related to the gray scale before correction. With the increase of the deflection angle of the liquid crystal, the color shift at the deflection angle is more serious. As such, in order to guarantee the viewable angle, the difference in display gray scale between the primary pixel 110 and the secondary pixel 120 is increased by the correction coefficient, that is, the weight is increased of the second gamma electric level in the first data electric level of the primary pixel 110 and the third gamma electric level is increased in the second data electric level of the sub-pixel 120, while the weight is decreased of the first gamma electric level in the first data electric level of the primary pixel 110 and the second data electric level is decreased of the secondary pixel 120 to improve the viewable angle.

Further, the correction coefficient K, the first gamma electric level $U_1$, the second gamma electric level $U_2$ and the first data electric level $U_{d1}$ satisfies $U_{d1} = (1-K)*U_1 + K*U_2$. The correction coefficient K, the first gamma electric level $U_1$, the third gamma electric level $U_3$ and the second data electric level $U_{d2}$ satisfies $U_{d2} = (1-K)*U_1 + K*U_3$, in which, the correction coefficient K satisfies 0≤K≤1. With the increase of the correction coefficient K, the weight of the second gamma electric level $U_2$ in the first data electric level $U_{d1}$ increases, the weight of the third gamma electric level $U_3$ in the second data electric level $U_{d2}$ increases, and the weight of the first gamma electric level $U_1$ in the first data electric level $U_{d1}$ and in the second data electric level $U_{d2}$ decreases accordingly. The technical solution of the present application will be further described hereinafter by taking the above correction coefficient K and the calculation relationship between these electric levels as an example. If other calculation relationships are used, those skilled in the art can make corresponding adjustments and will not repeat them herein.

In the display device, if the isolation correction coefficient determined according to the image isolation of the pixel is set to $K_U$, the frequency correction coefficient determined according to the image frequency of the pixel is set to $K_T$, the hue correction coefficient determined according to the hue of the pixel is set to $K_H$, and the saturation correction coefficient determined according to the saturation of the pixel is set to $K_S$, then the correction coefficient of the pixel K satisfies $K=K_U*K_T*K_H*K_S$, $0 \le K_U \le 1$, $0 \le K_T \le 1$, $0 \le K_H \le 1$, and $0 K_S \le 1$. In a relative simple embodiment, if the correction coefficient is determined only according to the color parameter, the correction coefficient of the pixel K satisfies $K=K_H*K_S$; if the correction coefficient is determined only from the hue, then $K=K_H$; if the correction factor is only determined based on saturation, then $K=K_S$.

In a specific embodiment, the hue correction coefficient $K_H$ satisfies $K_H=K_{H1}$ when the hue before pixel correction is within a preset hue range; when the hue before correction is outside the preset hue range, the hue correction coefficient $K_H$ satisfies $K_H=K_{H2}$; in which, a minimum hue of the preset hue range is greater than 8 degrees, and the maximum hue of the preset hue range is less than or equal to 24 degrees, and $K_{H1}>K_{H2}$. The hue correction coefficient is determined according to the range of the hue before pixel correction. For special display objects, such as faces, plants, animals, etc., they often correspond to a certain preset tonal range. The aforementioned special display objects are the most easily noticed of the whole display screen. Therefore, optimizing these display objects will help improve the user experience. Taking the face as an example, the face includes white face, yellow face and black face, which correspond to different hues. When determining the hue correction parameters according to the hue before pixel correction, the pixel is judged to correspond to at least a part of the displayed face, when the hue before pixel correction is within the preset hue range by comparing the hue of the pixel and the pre-stored hue corresponding to each ethnic face. The display effect is improved by increasing the hue correction coefficient.

Figure 9:
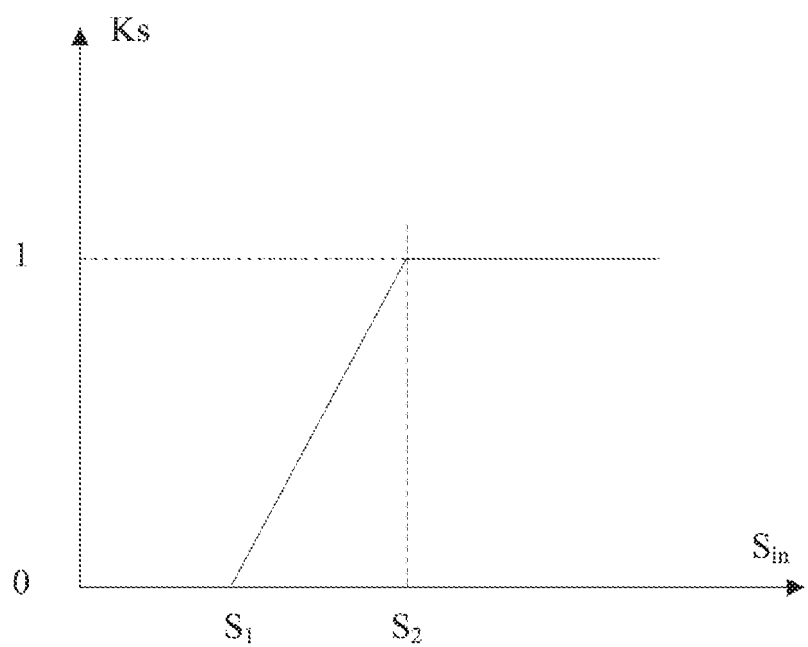
FIG. 9 is a schematic diagram of a relationship between saturation correction coefficient and the saturation in another specific embodiment of the driving method of the display device.

In another specific embodiment, as shown in FIG. 9, when the pixel saturation S before correction is less than or equal to the first preset saturation $S_1$, the saturation correction coefficient $K_S$ satisfies $K_S-0$. When the pixel saturation before correction S is greater than the first preset saturation $S_1$ and the pixel saturation before correction S is less than or equal to the second preset saturation $S_2$, the saturation correction coefficient $K_S$ satisfies $K_S=a+b*S$. When the pixel saturation before correction S is greater than the second preset saturation $S_2$, the saturation correction coefficient $K_S$ satisfies $K_S-1$. The first preset saturation $S_1$ is less than or equal to the second preset saturation $S_2$, the first coefficient a satisfies a≤0, and the second coefficient h satisfies b>0. In the display device, with the increase of saturation before pixel correction, the minimum deflection increases of liquid crystal in the pixel, and the possible color shift also increases. Accordingly, by setting a larger saturation correction coefficient, the correction intensity of the display parameters of the primary pixel and the secondary pixel are increased, thereby increasing the viewable angle and reducing the color shift.

Figure 10:
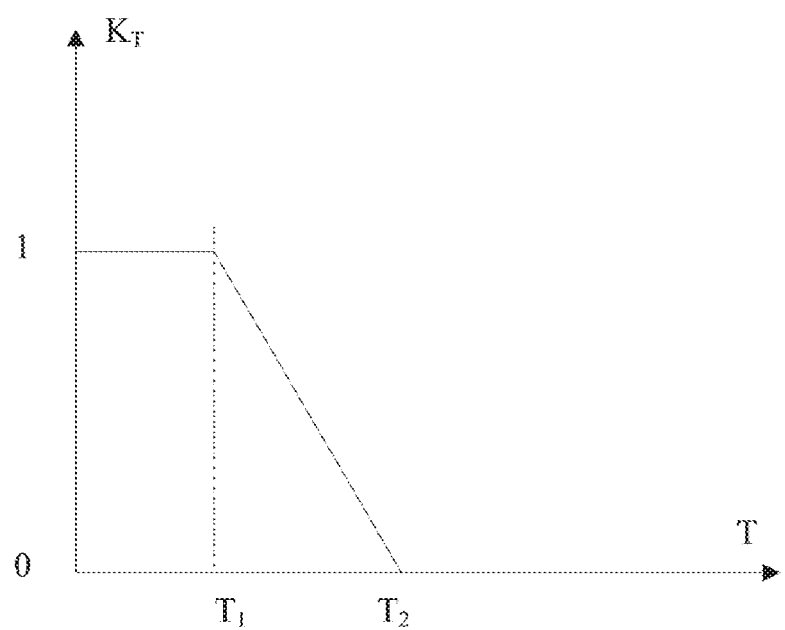
FIG. 10 is a schematic diagram of a relationship between the frequency correction coefficient and the image frequency in another specific embodiment of the driving method of the display device.

In another specific embodiment, as shown in FIG. 10, the frequency correction coefficient of the pixel $K_T$ satisfies $K_T=1$, when the image frequency of the pixel T is less than or equal to a first preset frequency. The correction coefficient of the pixel $K_T$ satisfies $K_T=cT-d$, when the image frequency of the pixel T is greater than the first preset frequency and the image frequency of the pixel T is less than or equal to the second preset frequency. The correction coefficient of the pixel $K_T$ satisfies $K_T=0$ when the image frequency of the pixel T is greater than the second preset frequency. In which, the first preset frequency $T_1$ is less than or equal to the second preset frequency $T_2$, the third coefficient c satisfies c<0, and the fourth coefficient d satisfies d>0. In the display device, with the increase of the image frequency of a pixel, the correction coefficient of the pixel is reduced, that is, the display brightness difference between adjacent primary pixels and secondary pixels is reduced to ensure the normal display of high-frequency images.

Figure 11:
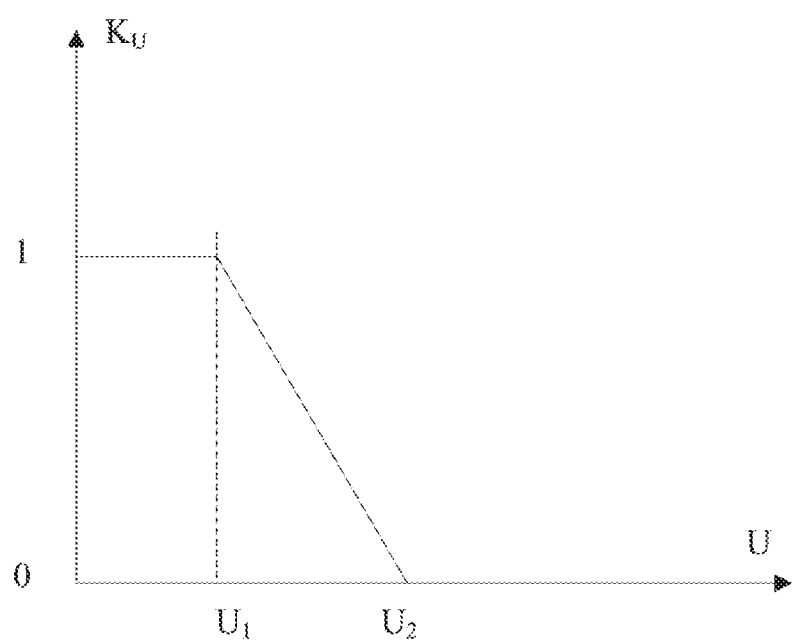
FIG. 11 is a schematic diagram of a relationship between be isolation correction coefficient and the image isolation in another specific embodiment of the driving method of the display device.

In another specific embodiment, as shown in FIG. 11, when the image isolation of the pixel U is less than or equal to the first preset isolation, the isolation correction coefficient of the pixel $K_U$ satisfies $K_U=1$. When the image isolation of the pixel U is greater than the first preset isolation and the image isolation of the pixel U is less than or equal to the second preset isolation, the isolation correction coefficient of the pixel $K_U$ satisfies $K_U=eU|f$. When the image isolation of the pixel U is greater than the second preset isolation, the isolation correction coefficient of the pixel $K_U$ satisfies $K_U=0$. In which, the first preset isolation $U_1$ is less than or equal to the second preset isolation $U_2$, and the fifth coefficient e satisfies e<0, and the sixth coefficient f satisfies f>0. The greater of image isolation, indicating that small objects such as cursors are displayed at corresponding positions in the display screen at this time. In order to avoid image distortion, the correction coefficient should be reduced accordingly to reduce the difference in display brightness between adjacent primary pixels and secondary pixels, thus improving display quality.

In another embodiment of the present application, the primary pixel includes a red sub-pixel, a green sub-pixel and a blue sub-pixel. Step S300 includes:

Step S321, adjusting a ratio of the gray scale of the red sub-pixel to the gray scale of the blue sub-pixel, so that the absolute change value of the chromaticity of the pixel before and after correction is less than or equal to a preset chromaticity difference.

When the display gray scale of each sub-pixel is determined, it is more convenient to adopt RGB color mode. In RGB color mode, the ratio of red (R) to blue (B) affects the chromaticity. Therefore, when adjusting the chromaticity of the primary pixel and the sub-pixel, it is realized by adjusting the ratio of gray scales of the red sub-pixel and the blue sub-pixel.

Specifically, the gray scale ratio of the red sub-pixel and the blue sub-pixel after correction is basically equal to the gray scale ratio of the red sub-pixel and the blue sub-pixel before correction, that is, when the corrected color is cold, the ratio of the gray scale of the red sub-pixel to the gray scale of the blue sub-pixel is increased. When the corrected chromaticity is warm, the ratio of the gray scale of the red sub-pixel to the gray scale of the blue sub-pixel is reduced so as to keep the chromaticity of the entire display panel constant. This adjustment method is simple to calculate, and by limiting the relationship between the gray scale of the red sub-pixel and the gray scale of the blue sub-pixel, it can also be avoided of the associated influence on the brightness of the pixel, thus improving the adjustment efficiency. In the actual adjustment process, since the desirable gray scale values of each sub-pixel are discrete, the value of gray scale that can achieve the closest proportion is selected to minimize the change in chromaticity.

In another embodiment of the present application, Step S300 includes:

Step S331: determining a corrected brightness of the primary pixel and a corrected brightness of the secondary pixel according to the correction coefficient;

Step S332: comparing the corrected brightness and a maximum brightness of the primary pixel;

Step S333: updating the corrected brightness of the primary pixel to the maximum brightness when the corrected brightness of the primary pixel is greater than the maximum brightness;

Step S334: updating the corrected brightness of the secondary pixel according to the updated brightness of the primary pixel;

Step S335: comparing the corrected brightness of the secondary pixel with the minimum brightness;

Step S336: updating the corrected brightness of the secondary pixel to the minimum brightness when the corrected brightness of the secondary pixel is less than the minimum brightness;

Step S337: updating the corrected brightness of the primary pixel according to the updated brightness of the secondary pixel;

In the present embodiment, considering the process of acquiring the first display parameter of the primary pixel and the second display parameter of the secondary pixel, it may appear that the brightness of the primary pixel acquired according to theoretical calculation exceeds the maximum brightness that the display device can display, which means, it is actually impossible to control the first display parameter of the primary pixel and the second display parameter of the secondary pixel according to the results of theoretical calculation. At this time, the brightness corrected by the primary pixel is updated to the maximum brightness, and in order to ensure the overall brightness of the display device to be substantially constant, the brightness corrected by the secondary pixel is updated according to the brightness corrected by the updated primary pixel so that the value of the brightness corrected by the secondary pixel relative to its brightness before correction is substantially equal to the value of the brightness increased by the corrected brightness of the updated primary pixel relative to its brightness before correction. Similarly, the corrected brightness of the sub-pixel obtained according to theoretical calculation may also be lower than the minimum brightness that the display device can display. As such, the corrected brightness of the sub-pixel is updated to the minimum brightness of the display device. And in order to ensure that the overall brightness of the display device is basically unchanged, the corrected brightness of the primary pixel is updated according to the corrected brightness of the updated secondary pixel, so that the value that the corrected brightness of the updated primary pixel increases relative to its corrected brightness is basically equal to the value that the corrected brightness of the updated secondary pixel decreased relative to its corrected brightness. In which, there is no definite sequence relationship between the whole of steps S332 to S334 and the whole of steps S335 to S337, that is, the primary pixel may be corrected first or the secondary pixel may be corrected first.

Figure 12:
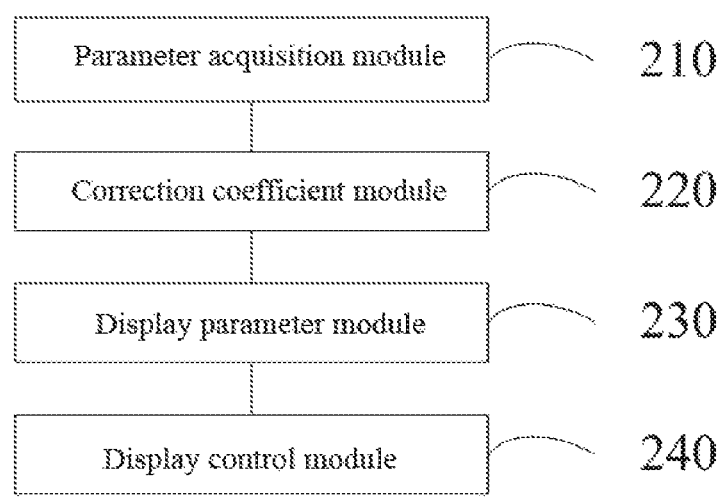
FIG. 12 is a structural schematic diagram of some embodiments of the display device of the present application.

The present application also provides a display device, as shown in FIGS. 4 and 12, which includes a display panel and a driving component. In which, the display panel includes a plurality of pixels arranged in an array, and at least some of which are primary pixels 110 and at least some of which are secondary pixels 120. The driving component is electrically connected to the display panel. The driving component includes a parameter acquisition module 210, a correction coefficient module 220, a display parameter module 230 and a display control module 240. In which, the parameter acquisition module 210 is configured to acquire at least one of a color parameter of the pixel, the image frequency and the image isolation, and the color parameter includes at least one of hue and saturation. The correction coefficient module 230 is electrically connected with the parameter acquisition module 210, and the correction coefficient module 220 is configured to determine the correction coefficient of the pixel according to the color parameter, the image frequency and/or the image isolation. The display parameter module 230 is electrically connected with the correction coefficient module 220, and the display parameter module 230 is configured to determine the display parameter of the pixels according to the correction coefficient. The display control module 240 is electrically connected with the display parameter module 230, and the display control module 240 is configured to control the pixels to display according to the display parameter. In which, a brightness of the primary pixel after correction is greater than a brightness before correction, and a brightness after correction of the secondary pixel is less than a brightness before correction. An absolute value of a sum change of the brightness of the primary pixel and the secondary pixel before and after correction is less than or equal to a preset brightness difference, and an absolute value of a chromaticity change of the pixel before and after correction is less than or equal to a preset chromaticity difference.

Figure 13:
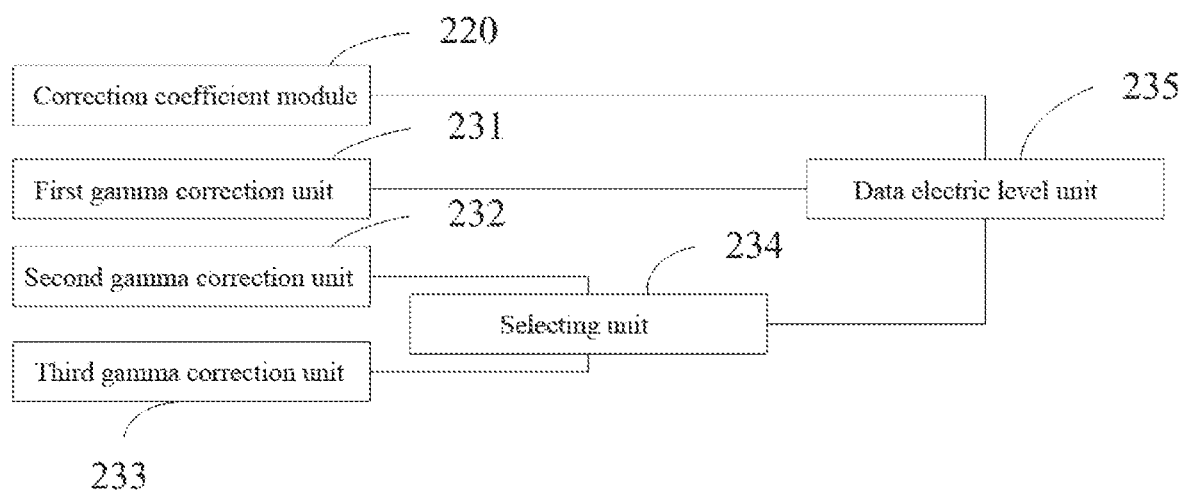
FIG. 13 is a structural schematic diagram of a correction coefficient module and a display parameter module of the display device in FIG. 12.

Further, as shown in FIG. 13, the pixel includes at least one sub-pixel, and a first display parameter includes a first data electric level of the sub-pixel of the primary pixel and a second data electric level of the sub-pixel of the secondary pixel. The display parameter module 230 includes: a first gamma correction unit 231, a second gamma correction unit 232, a third gamma correction unit 233, a selecting unit 234 and a data electric level unit 235. The first gamma correction unit 231 is configured to determine a first gamma electric level of the sub-pixel according to the first gamma value and the gray scale of the sub-pixel before correction. The second gamma correction unit 232 is configured to determine a second gamma electric level of the sub-pixel according to the second gamma value and the gray scale of the sub-pixel before correction. The third gamma correction unit 233 is configured to determine a third gamma electric level of the sub-pixel according to the third gamma value and the gray scale of the sub-pixel before correction. The selecting unit 234 is electrically connected to the second gamma correction unit 232 and the third gamma correction unit 233 and configured to select to acquire the second gamma electric level when a pixel is a primary pixel and the third gamma electric level when a pixel is a sub-pixel. The data electric level unit 235 is electrically connected to the correction coefficient module 220, the first gamma correction unit 231 and the selecting unit 234 and configured to determine a first data electric level of sub-pixels in the primary pixel according to the correction coefficient, the first gamma electric level and the second gamma electric level; or to determine a second data electric level of sub-pixel of the secondary pixel according to the correction coefficient, the first gamma electric level and the third gamma electric level in which, the gamma response corresponding to the mixing of the second gamma value and the third gamma value is equivalent to the gamma response corresponding to the first gamma value, and the second gamma value is not equal to the third gamma value. The configurations of the first gamma correction unit 231, the second gamma correction unit 232, and the third gamma correction unit 233 are similar to each other to obtain the gamma electric level after gamma correction according to the original signal of the display. The correction coefficient module 220 may include a comparison circuit, a calculation circuit and the like, to obtain corresponding a correction coefficient. The selecting unit 234 includes a selection circuit to select corresponding gamma electric levels for the primary pixel and the secondary pixel, respectively. In a specific embodiment, when the value of the correction coefficient is only 0 or 1, the data electric level unit 234 includes a selection circuit to select the corresponding gamma electric level as the first data electric level or the second data electric level. The structure of the display device and the flow of signals therein can be described with reference to various embodiments of the driving method of the display device of the present application, and will not be described herein.

This is only some embodiments of the present application and is not intended to limit the scope of the present application. Any equivalent structural change made under the concept of the present application using the contents of the present application specification and drawings, or directly/indirectly applied in other related technical fields, shall be included in the protection scope of the present application.

What is claimed is:

1. A driving method of a display device, wherein, the display device comprises a display panel comprising a plurality of pixels arranged in an array, at least a part of the pixels is a primary pixel and at least a part of the pixels is a secondary pixel;

the driving method of the display device comprises the following operations:
acquiring at least one of a color parameter, image frequency, and image isolation of a pixel, the color parameter comprising at least one of hue and saturation;
determining a correction coefficient of the pixel according to the color parameter, the image frequency, and/or the image isolation;
determining a display parameter of the pixel according to the correction coefficient; and
controlling the pixel to display according to the display parameter;
wherein, a brightness of the primary pixel after correction is greater than that of before correction, a brightness of the secondary pixel after correction is less than that of before correction, and an absolute value of a sum change of the brightness of the primary pixel and the secondary pixel before and after correction is less than or equal to a preset brightness difference, and an absolute value of a chromaticity change of the pixel before and after correction is less than or equal to a preset chromaticity difference.

2. The driving method of claim 1, wherein, the pixel comprises at least one sub-pixel, and the display parameter comprises a first data electric level of the sub-pixel of the primary pixel and a second data electric level of the sub-pixel of the secondary pixel;

the operation of determining the display parameter of the pixels according to the correction coefficient, comprises:
determining the first gamma electric level of the sub-pixel according to a first gamma value and the gray scale of the sub-pixel before correction;
determining the second gamma electric level of the sub-pixel according to a second gamma value and the gray scale of the sub-pixel before correction;
determining a first data electric level of sub-pixels of the primary pixel according to the correction coefficient, the first gamma electric level, and the second gamma electric level;
determining a third gamma electric level of the sub-pixel according to the third gamma value and the gray scale of the sub-pixel before correction; and,
determining a second data electric level of sub-pixel of the secondary pixel according to the correction coefficient, the first gamma electric level, and the third gamma electric level;
wherein, the gamma response corresponding to the mixing of the second gamma value and the third gamma value is equivalent to the gamma response corresponding to the first gamma value, and the second gamma value is not equal to the third gamma value.

3. The driving method of claim 2, wherein, the correction coefficient K, the first gamma electric level $U_1$, the second gamma electric level $U_2$, and the first data electric level $U_{d1}$ satisfies $U_{d1}=(1-K)*U_1+K*U_2$; the correction coefficient K, the first gamma electric level $U_1$, the third gamma electric level $U_3$, and the second data electric level $U_{d2}$ satisfies $U_{d2}=(1-K)*U_1+K*U_2$; wherein the correction coefficient K satisfies $0 \le K \le 1$.

4. The driving method of claim 3, wherein, the correction coefficient of the pixel K satisfies $K=K_U*K_T*K_H*K_S$;
wherein, $K_T$ is a frequency correction coefficient determined according to the image frequency of the pixel, $K_U$ is an isolation correction coefficient determined according to the image isolation of the pixel, $K_H$ is a hue correction coefficient determined according to the hue of the pixel, $K_S$ is a saturation correction coefficient determined according to the saturation of the pixel, and $0 \le K_U \le 1$, $0 \le K_T \le 1$, $0 \le K_H \le 1$, and $0 \le K_S \le 1$.

5. The driving method of claim 4, wherein, an operation of acquiring the image frequency of the pixel comprises:
acquiring a first gray scale $pixel_0$ of each sub-pixel of the pixel before correction;
acquiring a second gray scale $pixel_m$ of each sub-pixel in a neighboring pixel within a first preset distance adjacent to the pixel before correction;
calculating an absolute value of a difference between a second gray scale of a sub-pixel in the neighboring pixel and a first gray scale of the sub-pixel in the pixel $\Delta_m=|pixel_0-pixel_m|$, and recording the absolute value as a relative gray scale $\Delta_m$ of the neighboring pixel;
normalizing a maximum relative gray scale among the relative gray scale within the first preset distance adjacent to the pixel, and recording the normalized maximum relative gray scale $\eta_1$ max $(\Delta_m)$ as the image frequency of the pixel T, wherein $\eta_1$ is the frequency normalization coefficient.

6. The driving method of claim 5, wherein, the frequency correction coefficient $K_T$ of the pixel satisfies $K_T=1$, when the image frequency of the pixel T is less than or equal to a first preset frequency; the correction coefficient $K_T$ of the pixel satisfies $K_T=cT+d$, when the image frequency of the pixel T is greater than the first preset frequency and the image frequency of the pixel is less than or equal to the second preset frequency; the correction coefficient of the pixel $K_T$ satisfies $K_T=0$ when the image frequency of the pixel is greater than the second preset frequency; wherein the first preset frequency is less than or equal to the second preset frequency, the third coefficient c satisfies c<0 and the fourth coefficient d satisfies d>0.

7. The driving method of claim 4, wherein, an operation of acquiring the image isolation of the pixel comprises:
acquiring a first gray scale $pixel_0$ of each sub-pixel of the pixel before correction $pixel_0$;
obtaining a second gray scale $pixel_m$ of each sub-pixel in a neighboring pixel within a first preset distance adjacent to the pixel before correction;
calculating an absolute value of a difference between a second gray scale of a sub-pixel in the neighboring pixel and a first gray scale of the sub-pixel in the pixel $\Delta_m=|pixel_0-pixel_m|$, and recording the absolute value as a relative gray scale $\Delta_m$ of the neighboring pixel; and
comparing the relative gray scale $\Delta_m$ with a preset gray scale threshold $\Delta_0$, and accumulating a number of neighboring pixels $N(\Delta_n \geq \Delta_0)$ of which the relative gray scale $\Delta_m$ is greater than or equal to the preset gray scale threshold $\Delta_0$; and
recording a number of normalized neighboring pixels $\eta_2 N(\Delta_n \geq \Delta_0)$ as the image isolation of the pixel, and $\eta_2$ is the normalized coefficient of the isolation.

8. The driving method of claim 7, wherein, the isolation degree correction coefficient of the pixel $K_U$ satisfies $K_U=1$ when the image isolation of the pixel U is less than or equal to a first preset isolation degree; the isolation correction coefficient of the pixel $K_U$ satisfies $K_U=eU+f$, when the image isolation of the pixel U is greater than the first preset isolation degree and the image isolation of the pixel is less than or equal to the second preset isolation degree; the isolation degree correction coefficient of the pixel $K_U$ satisfies $K_U=0$, when the image isolation of the pixel U is greater than the second preset isolation degree; wherein the first preset degree of isolation is less than or equal to the second preset degree of isolation.

9. The driving method of claim 4, wherein, the hue correction coefficient $K_H$ satisfies $K_H=K_{H1}$ when the hue before pixel correction is within a preset hue range; when the hue before correction $K_H$ is outside the preset hue range, the hue correction coefficient satisfies $K_H=K_{H2}$, wherein, a minimum hue of the preset hue range is greater than 8 degrees, and the maximum hue of the preset hue range is less than or equal to 24 degrees, and $K_{H1}>K_{H2}$.

10. The driving method of claim 4, wherein, the saturation correction coefficient $K_S$ satisfies $K_S=0$, when the pixel saturation before correction S is less than or equal to a first preset saturation $S_1$; the saturation correction coefficient $K_S$ satisfies $K_S=a+b*S$, when the pixel saturation before correction S is greater than the first preset saturation $S_1$ and the pixel saturation before correction S is less than or equal to the second preset saturation $S_2$; the saturation correction coefficient $K_S$ satisfies $K_S=1$, when the pixel saturation before correction S is greater than the second preset saturation $S_2$; wherein the first preset saturation $S_1$ is less than or equal to the second preset saturation $S_2$, the first coefficient a satisfies a≤0, and the second coefficient b satisfies b>0.

11. The driving method of claim 3, wherein, the correction coefficient of the pixel K satisfies $K=K_H*K_S$;
wherein, $K_H$ is a hue correction coefficient determined according to the hue of the pixel, and $K_S$ is the saturation correction coefficient determined according to the saturation of the pixel, and $0 \leq K_H \leq 1$ and $0 \leq K_S \leq 1$.

12. The driving method of claim 11, wherein, the hue correction coefficient $K_H$ satisfies $K_H=K_{H1}$ when the hue before pixel correction is within a preset hue range; the hue correction coefficient $K_H$ satisfies $K_H=K_{H2}$, when the hue before correction is outside the preset hue range; wherein, a minimum hue of the preset hue range is greater than 8 degrees, and the maximum hue of the preset hue range is less than or equal to 24 degrees, and $K_{H1}>K_{H2}$.

13. The driving method of claim 11, wherein, the saturation correction coefficient $K_S$ satisfies $K_S=0$, when the pixel saturation before correction S is less than or equal to a first preset saturation $S_1$; the saturation correction coefficient $K_S$ satisfies $K_S=a+b*S$, when the pixel saturation before correction S is greater than the first preset saturation $S_1$ and the pixel saturation before correction S is less than or equal to a second preset saturation $S_2$; the saturation correction coefficient $K_S$ satisfies $K_S=1$, when the pixel saturation before correction S is greater than the second preset saturation $S_2$; wherein, the first preset saturation $S_1$ is less than or equal to the second preset saturation $S_2$, the first coefficient a satisfies a≤0 and the second coefficient b satisfies b>0.

14. The driving method of claim 1, wherein, the pixel comprises at least one sub-pixel;
the operation of acquiring the image frequency of the pixel comprises:
acquiring a first gray scale $pixel_0$ of each sub-pixel of the pixel before correction;
obtaining a second gray scale $pixel_m$ of each sub-pixel in a neighboring pixel within a first preset distance adjacent to the pixel before correction;
calculating an absolute value $\Delta_m=|pixel_0-pixel_m|$ of a difference between a second gray scale of a sub-pixel in the neighboring pixel and a first gray scale of the sub-pixel in the pixel, and recording the absolute value as a relative gray scale $\Delta_m$ of the neighboring pixel;
normalizing a maximum relative gray scale among the relative gray scales of adjacent pixels within the first preset distance, and recording the normalized maximum relative gray scale $\eta_1$ max $(\Delta_m)$ as the image frequency T of the pixel, wherein $\eta_1$ is the frequency normalization coefficient.

15. The driving method of claim 1, wherein, the pixel comprises at least one sub-pixel;
the operation of obtaining the image isolation of the pixel comprises:
acquiring a first gray scale $pixel_0$ of each sub-pixel of the pixel before correction;
obtaining a second gray scale $pixel_m$ of each sub-pixel in a neighboring pixel within a first preset distance adjacent to the pixel before correction;
calculating an absolute value of a difference $\Delta_m=|pixel_0-pixel_m|$ between a second gray scale of a sub-pixel in the neighboring pixel and a first gray scale of the sub-pixel in the pixel, and recording the absolute value $\Delta_m$ as a relative gray scale of the neighboring pixel;
comparing the relative gray scale $\Delta_m$ with a preset gray scale threshold $\Delta_0$, and accumulating a number of neighboring pixels $N(\Delta_n \geq \Delta_0)$ of which the relative gray scale $\Delta_m$ is greater than or equal to the preset gray scale threshold $\Delta_0$; and
recording a number of normalized neighboring pixels $\eta_2 N(\Delta_n \geq \Delta_0)$ as the image isolation of the pixel, and $\eta_2$ is a normalized coefficient of the isolation.

16. The driving method of claim 1, wherein, the pixel comprises a red sub-pixel, a green sub-pixel, and a blue sub-pixel;

the operation of determining the display parameter of the pixels according to the correction coefficient, comprises:
adjusting a ratio of the gray scale of the red sub-pixel to the gray scale of the blue sub-pixel, so that the absolute change value of the chromaticity of the pixel before and after correction is less than or equal to a preset chromaticity difference.

17. The driving method of claim 1, wherein, the operation of determining the display parameter of the pixels according to the correction coefficient comprises:
determining a corrected brightness of the primary pixel and a corrected brightness of the secondary pixel according to the correction coefficient;
comparing the corrected brightness and a maximum brightness of the primary pixel;
updating the corrected brightness of the primary pixel to the maximum brightness when the corrected brightness of the primary pixel is greater than the maximum brightness;
updating the corrected brightness of the secondary pixel according to the updated brightness of the primary pixel;
comparing the corrected brightness of the secondary pixel with the minimum brightness;
updating the corrected brightness of the secondary pixel to the minimum brightness when the corrected brightness of the secondary pixel is less than the minimum brightness; and
updating a brightness of the primary pixel after correction, according to the updated brightness of the sub-pixel after correction.

18. A display device, wherein, the display device comprises:
a display panel comprising a plurality of pixels arranged in an array, at least a part of the pixels is a primary pixel and at least a part of the pixels is a secondary pixel;
at least one processing unit and at least one memory comprising instructions that when executed by the at least one processing unit cause the system to:
acquire at least one of a color parameter, image frequency, and image isolation of a pixel, the color parameter comprising at least one of hue and saturation;
determine a correction coefficient of the pixel according to the color parameter, the image frequency, and/or the image isolation;
determine a display parameter of the pixel according to the correction coefficient; and
control the pixel to display according to the display parameter;
wherein, a brightness of the primary pixel after correction is greater than that of before correction, a brightness of the secondary pixel after correction is less than that of before correction, and an absolute value of a sum change of the brightness of the primary pixel and the secondary pixel before and after correction is less than or equal to a preset brightness difference, and an absolute value of a chromaticity change of the pixel before and after correction is less than or equal to a preset chromaticity difference.

19. The display device of claim 18, wherein, the pixel comprises at least one sub-pixel, and a first display parameter comprises a first data electric level of the sub-pixel of the primary pixel and a second data electric level of the sub-pixel of the secondary pixel;
the at least one memory comprising instructions that when executed by the at least one processing unit cause the system to determine the display parameter of the pixels according to the correction coefficient, further comprises: to
determine the first gamma electric level of the sub-pixel according to a first gamma value and the gray scale of the sub-pixel before correction;
determine the second gamma electric level of the sub-pixel according to a second gamma value and the gray scale of the sub-pixel before correction;
determine a first data electric level of sub-pixels of the primary pixel according to the correction coefficient, the first gamma electric level, and the second gamma electric level;
determine a third gamma electric level of the sub-pixel according to the third gamma value and the gray scale of the sub-pixel before correction; and,
determine a second data electric level of sub-pixel of the secondary pixel according to the correction coefficient, the first gamma electric level, and the third gamma electric level;
wherein, the gamma response corresponding to the mixing of the second gamma value and the third gamma value is equivalent to the gamma response corresponding to the first gamma value, and the second gamma value is not equal to the third gamma value.

20. A driving method of a display device, wherein, the display device comprises a display panel comprising a plurality of pixels arranged in an array, at least a part of the pixels is a primary pixel and at least a part of the pixels is a secondary pixel;
the driving method of the display device comprises the following operations:
acquiring a color parameter, image frequency and image isolation of a pixel, the color parameter including at least one of hue and saturation;
determining a correction coefficient of the pixel according to the obtained color parameter, the image frequency and the image isolation, wherein, the correction coefficient K satisfies $0 \leq K \leq 1$;
determining a display parameter of the pixel according to the correction coefficient; and
controlling the pixel to display according to the display parameter;
wherein, a brightness of the primary pixel after correction is greater than that of before correction, a brightness of the secondary pixel after correction is less than that of before correction, and an absolute value of a sum change of the brightness of the primary pixel and the secondary pixel before and after correction is less than or equal to a preset brightness difference, and an absolute value of a chromaticity change of the pixel before and after correction is less than or equal to a preset chromaticity difference.

* * * * *